(12) United States Patent
Gottlieb et al.

(10) Patent No.: US 6,393,112 B1
(45) Date of Patent: May 21, 2002

(54) SYSTEM METHOD FOR FACILITATING INTELLIGENT NETWORK CALL PROCESSING USING A CALL CONTEXT DATABASE

(75) Inventors: Louis G. Gottlieb, Colorado Springs, CO (US); Arunachalam Venkatraman, Plano, TX (US); Eric E. Zimmerer, Santa Clara, CA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/432,039

(22) Filed: Nov. 1, 1999

(51) Int. Cl.[7] .............................................. H04M 15/00
(52) U.S. Cl. .............. 379/112.01; 379/111; 379/112.02; 379/112.06; 379/114.01; 379/114.28; 379/133
(58) Field of Search .................... 379/111, 112.01, 379/112.02, 112.06, 114.01, 114.14, 133, 134, 220.01, 221.08, 221.09, 221.1, 221.14, 114.03, 114.05, 114.28, 114.29

(56) References Cited

U.S. PATENT DOCUMENTS

| | | | |
|---|---|---|---|
| 5,592,530 A | | 1/1997 | Brockman et al. |
| 5,606,601 A | | 2/1997 | Witzman et al. |
| 5,737,399 A | * | 4/1998 | Witzman et al. ............ 379/112 |
| 5,774,532 A | * | 6/1998 | Gottlieb et al. ............. 379/112 |
| 5,799,073 A | | 8/1998 | Fleischer, III et al. |
| 5,878,126 A | * | 3/1999 | Velamuri et al. ............ 379/219 |
| 5,903,639 A | | 5/1999 | Lipchock et al. |
| 5,946,379 A | * | 8/1999 | Bhusri ......................... 379/115 |
| 6,028,914 A | | 2/2000 | Lin et al. |
| 6,282,280 B1 | * | 8/2001 | Rekieta et al. .............. 379/230 |

* cited by examiner

Primary Examiner—Stella Woo
Assistant Examiner—Quoc Tran

(57) ABSTRACT

System and method for facilitating intelligent network call processing using a centralized call context database. The system and method include and involve a call context database and an intelligent telecommunications network that is coupled to the call context database. The network includes and involves an access network element capable of receiving a call, generating first call context data and a network call identifier related to the call, storing the call context data and the network call identifier in the call context database, transmitting the network call identifier, and processing the call. The network further includes and involves a plurality of network elements that are coupled to the call context database and to the access network element. Each network element is capable of receiving the call and/or data related to the call (e.g., signaling data) and the network call identifier from the access network element, generating second call context data related to the call, storing the second call context data in the call context database, transmitting the network call identifier to another network element, retrieving call context data stored in the call context database based on the network call identifier, and processing the call based on the call context data retrieved from the call context database.

42 Claims, 10 Drawing Sheets

SYSTEM METHOD FOR FACILITATING INTELLIGENT NETWORK CALL PROCESSING USING A CALL CONTEXT DATABASE

BACKGROUND OF THE INVENTION

1. Field of the Invention

The present invention relates to systems and methods that are used to process calls within intelligent telecommunications networks such as within intelligent distributed network architectures.

2. Description of the Related Art

Intelligent telecommunications networks are well known. Such networks are used to provide calling card services, voice response services, conference calling services, and other call service to callers within a telecommunications system. The wide-spread deployment of intelligent telecommunications networks has resulted in large platforms that include a host of network elements and call management processes. Such network elements include feature/function processors (voice response units, etc.), intelligent peripherals, switches, and automated call processors that process calls to provide corresponding services.

In operation, each network element maintained and operated within an intelligent telecommunications network generates and collects call-related data ("call context data") pertaining to each call that is processed. As such, large amounts of call context data have to be managed and processed in the typical intelligent telecommunications network platform.

Data collection and management present significant problems for designers, operators, and users of intelligent telecommunications networks. For example, in addition to needing certain standard data on a call (e.g., call routing data, etc.), each network element gathers, generates, and manages its own data necessary to properly process a call. As such, large amounts of varied and redundant data are stored by multiple storage facilities which are not commonly addressed. Network elements have no way of addressing a consolidated and complete call context record related to a call. And, in many instances, this problem may require a caller to re-enter data (DTMF data retrieved from keypad sequences in response to audible queries—"Press 1 for Sales, 2 for technical support . . . ," etc.) during a call in order to have the call processed appropriately by several network elements which are involved in call completion.

Numerous attempts have been made to address the aforementioned problems associated with call context data collection and management. These attempts range from sophisticated database distribution schemes to speed data collection and retrieval, to transferring or passing whole collections of call context data from one network element to another during a call to enable appropriate call processing. Unfortunately, such attempts have not minimized the amount of data, data redundancy, and burden and inconvenience to callers that have been realized as a result of the operation of intelligent telecommunications networks. And, in many cases, such attempts have exacerbated existing call context data collection and management problems. For example, passing collections of call context data among network elements has further resulted in a bandwidth usage problem associated with moving large amounts of call context data from one network element to another via a signaling network or call transport network. Such a bandwidth problem has lead to inefficient communications and loss of call processing capacity.

Thus, there exists a need to provide systems and methods for facilitating intelligent network call processing through use of a call context database that may be commonly addressed. To be viable, such systems and methods must allow network elements within an intelligent network to generate, access, and retrieve call context data effectively and efficiently.

SUMMARY OF THE INVENTION

The present invention addresses the limitations and problems associated with the related art by providing systems and methods that facilitate intelligent network call processing using a centralized call context database. Each network element may generate, store, and retrieve call context data in relation to the centralized call context database. The call context database is accessible by a network element in real-time during a call based on a network call identifier that is generated and assigned by an access network element (e.g., an access switch that initially receives a call) to each call. As a call is processed within an intelligent network, only the network call identifier is passed from network element to network element. Each network element need only possess the network call identifier to access the centralized call context database to obtain some or all context data related to a particular call. By centralizing all call context data in one logically addressed data store, efficient and effective servicing of calls may be accomplished without realizing data bandwidth problems that have not been successfully addressed by prior systems and methods.

Accordingly, the present invention provides a system for processing calls in a telecommunications system that includes a call context database and an intelligent telecommunications network that is coupled to the call context database. The intelligent telecommunications network includes a plurality of network elements. Each network element is capable of receiving a call, generating call context data and a network call identifier related to the call, storing the call context data and the network call identifier in the call context database, retrieving the call context data from the call context database based on the network call identifier, and processing the call in accordance with the call context data.

According to another aspect of the present invention, provided is a system for facilitating intelligent network call processing using a call context database that includes a call context database and an intelligent telecommunications network that is coupled to the call context database. The network includes and involves an access network element capable of receiving a call, generating first call context data and a network call identifier related to the call, storing the first call context data and the network call identifier in the call context database, transmitting the network call identifier, and processing the call. The network further includes a plurality of network elements that are coupled to the call context database and to the access network element. Each network element is capable of receiving the call from the access network element, generating second call context data related to the call, storing the second call context data in the call context database, transmitting the network call identifier to another network element, retrieving all call context data stored in the call context database based on the network call identifier, and processing the call based on all of the call context data retrieved from the call context database.

According to another aspect of the present invention, provided is a method for processing calls in a telecommunications network that includes the steps of receiving a call, generating call context data and a network call identifier related to the call, storing the call context data and the network call identifier in a call context database, retrieving the call context data from the call context database based on the network call identifier, and processing the call in accordance with the call context data.

According to another aspect of the present invention, provided is a method for processing calls in a telecommunications network that includes the steps of receiving a call at an access network element within the telecommunications network, generating first call context data and a network call identifier related to the call, storing the first call context data and the network call identifier in a call context database, processing the call, transmitting the network call identifier, and at network element, receiving the call from the access network element. The method also includes the steps of generating second call context data related to the call, storing the second call context data in the call context database, retrieving all call context data stored in the call context database based on the network call identifier, and processing the call based on all of the call context data retrieved from the call context database.

According to another aspect of the present invention, a system for managing a telephone network is provided that includes a call context database for storing call context data related to calls processed by network elements within the telephone network, and a management system coupled to the call context database and operative to access the call context database, to retrieve the call context data from the call context database, and to process the call context data by performing a management operation.

According to another aspect of the present invention, provided is a method for managing a telephone network that includes the steps of storing call context data related to calls processed by network elements within the telephone network in a call context database, accessing the call context database, retrieving the call context data from the call context database, and processing the call context data by performing a management operation.

BRIEF DESCRIPTION OF THE DRAWINGS

The present invention is described in detail below with reference to the following drawing figures of which.

DETAILED DESCRIPTION OF THE PREFERRED EMBODIMENTS

Figure 1:
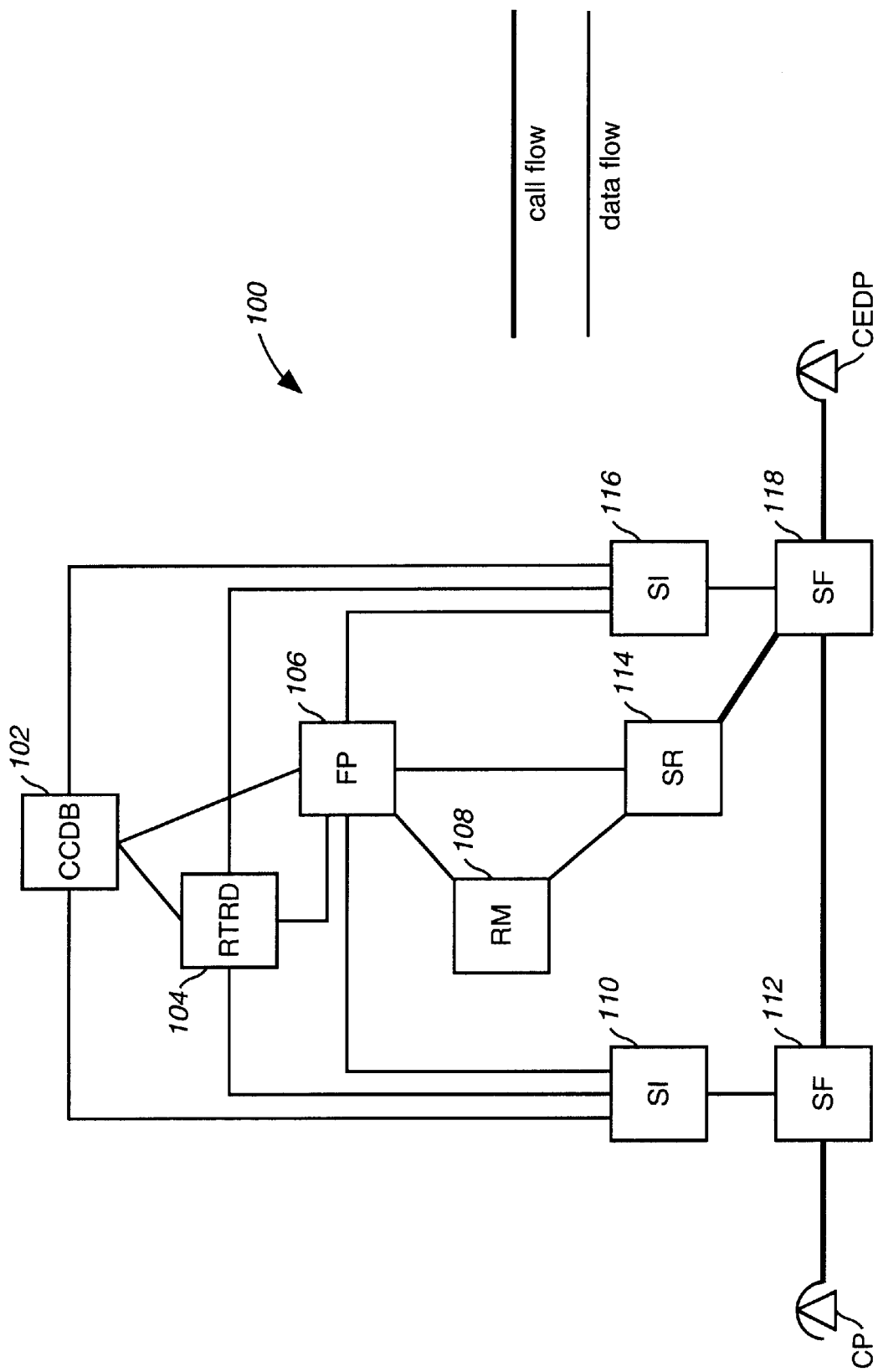
FIG. 1 is a block diagram of an intelligent distributed network architecture (IDNA) in which a centralized call context database is managed to facilitate call processing according to a preferred embodiment of the present invention.

The present invention is now discussed in detail with reference to the drawing figures that were briefly described above. A discussion of the structural aspects of the present invention is followed by a discussion of corresponding operational aspects. Unless otherwise indicated, like parts and processes are referred to with like reference numerals.

STRUCTURAL ASPECTS OF THE PRESENT INVENTION

To illustrate the salient features of the present invention, the following discussion often refers to various functions that are to be carried out by physical structures and devices within an intelligent distributed network architecture (IDNA). Since many of the structures of an IDNA are well know, detailed descriptions other than functional specifications of the same are omitted for purposes of brevity.

Referring now to FIG. 1, depicted therein is a block diagram of an intelligent distributed network architecture (IDNA) 100 in which a centralized call context database is managed to facilitate call processing according to a preferred embodiment of the present invention. The network elements illustrated in FIG.1 represent logical call processing functions which may be carried out by one or more physical network devices such as one or more computing systems, etc. Those skilled in the art will readily understand that the physical devices used to implement such functions may be integrated or segregated. For example, switch fabric (SF) and switch intelligence (SI) may be implemented in a single switch matrix unit. An exemplary mapping of logical functions to physical structures is found in FIG. 3 discussed below.

In IDNA 100, call flows are illustrated by broad connecting lines, while data flows are illustrated by narrower connecting lines. Such call flows may be implemented as voice trunks. Data flows within IDNA 100 may be out-of-band signaling links similar or like SS7 signaling links which will be readily understood by those skilled in the art. The flow of calls from both data (call content such as voice, etc.) and signaling perspectives is described in FIGS. 7A–7C as discussed below. In the context of the present invention, a call includes both content (e.g., voice over a voice trunk) and data about the call (e.g., routing and signaling data, etc.). A particular network element may receive and/or process a call by receiving all or part of a call. For example, a data access point (DAP) may receive only call signaling data related to a call, while a switch may process both content (a voice line) and data about a call (e.g., signaling data generated by the switch, etc.). Accordingly, for purposes of clarity, the nature of a network element that processes a call within an intelligent distributed network will indicate the nature of the inputs and outputs to that network element.

The IDNA 100 includes a centralized call context database (CCDB) 102, one or more real-time routing directors (RTRD) 104, one or more feature/function processors (FP) 106, one or more resource managers (RM) 108, switch intelligence (SI) processors 110, 116, special resources (SR) 114, and switch fabric(s) (e.g., switching systems) (SF) 112, 118. These structures are described below.

The SFs 112, 118 function to switch calls in a telecommunications network. In a circuit-switched network, for example, such switching may comprise switching a call on an inbound circuit port to a outbound circuit port (e.g., a call from a calling party (CP) to a called party (CEDP)). The SFs 112 and 118 are considered non-intelligent systems as they are controlled via external intelligence and systems such as SIs 110, 116. The SIs 110, 116 function to provide switching intelligence for SFs 112 and 118, respectively. When an SF system or component (e.g., SF 112, 118, etc.) receives a call, SI 110 or 116 controls the SF that is processing the call. The SIs 110, 116 determine how SFs 112, 118 should route the call. The SI processing will be readily understood by those skilled in the art.

The RTRD 104 determines which services need to be rendered for and during a call, and determines which IDNA 100 network element(s) should be provisioned to perform such services. The RTRD 104 may be used to perform simple translations for calls, but typically, RTRD 104 sends control of a call to another network element such as FP 106. The RTRD 104 also is responsible for determining the optimal network element for processing a call, in terms of both network element type and network element location in IDNA 100. Typically, all calls accessing IDNA 100 result in SIs 110, 116 issuing a query to RTRD 104 for call processing instructions. An RTRD may be implemented within a switch, within an adjunct processor, etc. Preferably, each switch (SF/SI combination) is co-located with an RTRD like RTRD 104, since an RTRD 104 is responsible for determining, with regard to the service(s) needed and the switch's location, the optimal (e.g., closest, etc.) network element(s) to which to send a call query. The processing to bring about such functionality will be readily understood by those skilled in the art.

The FP 106 is a computer system that includes hardware and software that performs specific service-oriented functions. Although switches and special resources like SR 114 (e.g., a voice response unit, etc.) actually process and service a call (e.g., routing a call and playing an audio recording, etc.) FP 106 and RTRD 104 determine how a call should be processed and by which network elements. The RTRD 104 is queried by SI 110 and/or 116 to determine how a network element like an SF (e.g., SF 112, 118, etc.) should route a call. For many (if not all) services offered by IDNA 100, RTRD 104 may pass control of the call to an FP like FP 106. The SIs 110, 116 also may pass control directly to FP 106 by issuing an appropriate query. Additionally, FP 106 may be used for one-to-one routing translations, or it may perform more intelligent processing for calls.

Typically, FP 106 will include one or more application programs that are accompanied by corresponding service-oriented databases. The representation of an FP in FIG. 1 is intended to imply the inclusion of both application programs and databases needed to process features for various services. Examples of such application programs and database combinations include local number portability (LNP) application processes and databases, home locate registry (HLR) applications used for wireless cellular services, enhanced routing application processes and databases that perform rules-based routing, automated call processes (ACP) that perform processing of interactive voice response applications, service control point (SCP) processes, data access point (DAP) processes, load balancing and termination availability processes for call center services, and call parking management processes.

In IDNA 100, SR 114 is a collection of one or more network elements that perform special services on calls, under the control of another network element such as FP 106 and SI 110. Typically, SRs are part of the traffic bearing network that includes voice links to switches. The SRs include interactive voice response units (IVRUs) that perform voice recognition and audio playback for callers, fax machines & ports, operator positions, conference bridges, etc.

The RM 108 is a network element that is responsible for management of special resources like SR 114. An exemplary RM is a call partking manager which tracks available and busy ports on a VRU. The RM 108 monitors each special resource. The RM 108 is accessible by any feature processor (e.g., FP 106) that can invoke the services of a special resource (e.g., SR 114). For example, when FP 106 determines that a call needs to be routed to a VRU, FP 106 queries RM 108 for an available VRU. The RM 108 selects a VRU with an available port, responds to FP 106 with a designation of the selected VRU, and then designates that VRU port as busy until call completion.

Most calls processed within IDNA 100 will traverse multiple network elements (switches, special resources, etc.). Likewise, control of a call, in most cases, will traverse multiple network elements (e.g., RTRD, FP, etc.). Each network element that processes a call in some way, creates a network event record (NER). An NER includes call context data that describes the call and how it was or will be processed by the network element that created the NER. Such call context data includes an ANI (automatic number identifier or calling party number) and, often, caller entered data. Additionally, data that are pertinent to the context of a call (e.g., routing data, etc.) and which are generated by a network element may be written to an NER. Typically, several NERs are generated and managed for each call that is processed within IDNA 100 and, in particular, by the network elements that process each call.

As noted above, in the past, each network element that processes a call passes its call context data along with all call context data that it received from upstream network elements to a next network element that is to further process the call. In that way, each successive network element will know the entire context of a call, which is necessary to perform appropriate call processing and provide the necessary services for the call. Typically, call context data (e.g., ANI, caller entered data, routing data, etc.) is transferred across a signaling network such as an SS7-based network or other call transport network. Since a call can cause generation of a large volume of call context data, the transfer of all call context data from network element to network element requires valuable bandwidth on the signaling or call transport network. Unfortunately, because of the volume of data that is transferred, some information such as that collected from a caller may not get transferred from one network element to another. As a result, a particular network element may be required to collect the information thereby causing a caller to enter such information or data a second time. Redundant entry of data has become an inconvenience to callers.

The aforementioned and described problems associated with transferring and passing call context data among network elements has been solved by the present invention. In particular CCDB 102 provides for the centralized and consolidated collection and storage of call context data within IDNA 100. All network elements within IDNA 100 that generate NERs (e.g., streams of call context data, call context messages, etc.) are coupled to CCDB 102 and write their NERs to the CCDB. Any network element that receives and/or processes a call already in progress, can query (in real-time during call processing) the consolidated call context data source managed by CCDB 102 for call context data related to that call. The use of CCDB 102 eliminates the need for much of the signaling that would otherwise be carried out on SS7 links, for example. The CCDB 102 also simplifies development and maintenance of network elements by providing both a single address for writing NERs and a single source for retrieving call context data related to calls already in progress. Additionally, centralization and consolidation of call context data are especially valuable when adding new sub-networks, network elements, and services to IDNA 100. For example, if a new type of feature processor is to be added to IDNA 100, the developers of that feature processor need only refer to CCDB 102 within IDNA 100 for call context data, rather than having to develop elaborate interfaces to each other network element with which the new feature processor will communicate.

Figure 8:
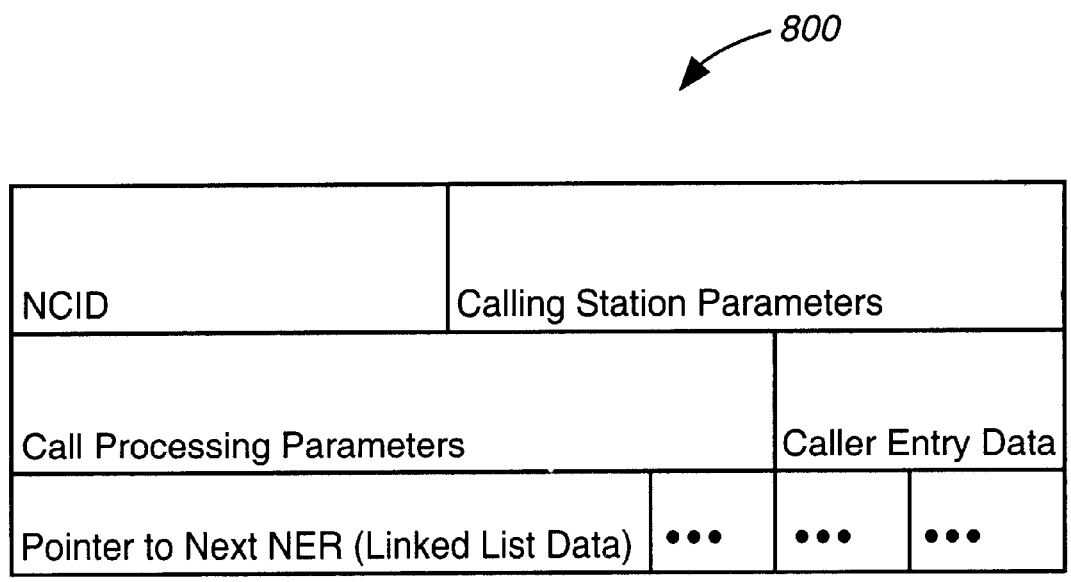
FIG. 8 is a diagram of a network event record of the type that is generated by a network element within an intelligent distributed network architecture and which is stored and managed in a centralized call context database according to a preferred embodiment of the present invention.

To facilitate the operation of CCDB 102 and to provide its benefits within IDNA 100, multiple NERs for a single call are related via a network call identifier (NCID). The first network element (e.g., switch, etc.) that receives a call (the "access switch") assigns a NCID to the call. Such assignment is carried out by switch intelligence (e.g., SI 110, 116) through well-known key assignment techniques (e.g., next number assignment, random assignment, etc.). In any case, in IDNA 100, SI 110 can write a call context record or NER in CCDB 102, using the NCID as a key to the same. As the call is routed through IDNA 100, the assigned 10 NCID may be included in an SS7 Initial Address Message (IAM) for the call. Each network element that receives the call, also receives the NCID within the call's IAM. Using the NCID, each network element can retrieve call context data from CCDB 102, and can also write call context data to the appropriate call context record (e.g., a linked-list of NERs) stored and managed thereby. An exemplary NER is shown in FIG. 8 which is discussed below.

The structures within IDNA 100 are designed and arranged to enable many different types of services on a common network platform. Each network element is responsible for carrying out certain tasks in processing a call. To perform such tasks, a network element must have certain data on a call. As noted above, a network element also may generate new data on a call. All such data are to be considered call context data which are to be stored and managed by CCDB 102. In sum, call context data centrally stored and managed by CCDB 102 is needed by IDNA 100 to identify, service, route, and bill a call. Generally, there are six types of call context data that may be centrally managed by CCDB 102: key data, origination data, termination data, billing data, dialed number data, and call transfer data. These data include both specific types of data for a particular network element and general types of data related to call processing and the like (e.g., routing, etc.).

Key data is needed to identify a call. Key data includes the NCID as discussed above, a local call identifier (LCID), and a super call identifier (SCID). The NCID identifies a culmination of call legs that provide links between two parties. The NCID may be assigned to a call by the access switch (e.g., an access SI). Alternately, an NCID according to the present invention may be assigned by the first FP that processes the call. The access switch creates and writes a call context record (e.g., a network event record "NER") to the CCDB for the call, and the CCDB manages the NCID as the key to record. The NCID is then passed in the IAM message for the call among network elements, so that each network element that receives and processes the call can query the IAM for the NCID, and then use that NCID as a key for retrieving the call's consolidated and centralized call context data from CCDB 102. An exemplary NCID is described co-pending U.S. patent application Ser. No. 08/581,739 which is commonly assigned to the owner of the present invention.

An LCID identifies a call leg, such as a portion of a call that accesses IDNA 100 or that terminates from IDNA 100. An LCID is generated and assigned only by switches. Two or more call legs, each identified with an LCID, can comprise a call which is to be identified by a NCID.

An SCID identifies multiple network calls that are involved in the same service. For example, a conference call can involve five (5) different parties. The series of call legs connecting a single party to a conference bridge is identified by an NCID. The culmination of all call legs connecting all five parties to the conference bridge is identified by an SCID.

Key data also may include forward and backward pointers to the network elements that generate call context data. Such pointers will provide a way of determining the actual network elements that were involved in service provision.

Origination data is data that is needed to identify the calling party and the call that arrived on the IDNA 100. Origination data is used to determine the services available to the calling party. Some examples of origination data include originating switch identifiers (access switch identifiers), originating trunk group identifiers, originating port identifiers, originating circuit identifiers, originating trunk class identifiers, caller ANI, calling line identifiers (CLI), carrier identification code (CIC), CLI class, and network access type.

Termination data is data that is needed to route a call to a called party. Termination data includes the results of any queries to external databases, such as HLRs for cellular services or databases for local number portability. Some other examples of termination data include terminating switch identifiers, terminating trunk group identifiers, terminating port identifiers, terminating circuit identifiers, terminating trunk class identifiers, action codes, translated network routing addresses, business classifications, overflow switch and trunk group indicia, overflow cause values, and various other codes that result from call processing by network elements.

Billing data is data that is collected during the course of a call that is not needed for routing, but is used by back-office systems for billing and statistics collection and processing. Billing data includes time points and flags for features used. For example, one time point may be "operator seized," indicating that the call was answered and serviced by an operator; and another time point is "operator released." The difference represents the time spent by an operator handling the call, and may be used for billing and statistics reporting. Other examples of billing data include calling card numbers, personal identification numbers (PINs), customer identifiers, feature codes, terminating network codes, network access types, geographic division indicia, overflow counts, and disconnect reasons.

Dialed number data are the digits that a calling party dialed. Since many dialed numbers are translated by an FP when the call first hits IDNA 100, it is important to preserve the original dialed number. This category also includes access numbers for remote or calling card access, and any supplemental codes, such as PINs that a caller may enter during a call.

Call transfer data is the intermediate data generated when calls are transferred across IDNA 100. Call transfer data includes switch and trunk group indicia at each intermediate step during call processing.

As such, to manage network event records (NERs) that may include data as described above, a call context record may be created in CCDB 102 by an access switch or an FP, using a unique NCID as a key. The call context record includes any or all of the above-described types of data elements. Each data element in a call context record is populated by data received in an NER created by a network element within IDNA 100. Likewise, a network element can send a query message to CCDB 102. A query message may request one or more data elements related to a call. Such a query message will include the NCID, the key to the centrally located call context record pertaining to a call.

The network elements within IDNA 100 communicate data as described above with each other via an Intelligent Distributed Network Operating System (IDNOS). The IDNOS operates a data communications network that is used by the network elements within IDNA 100 to communicate with each other. The IDNOS is distinct from the traffic bearing network. The IDNOS is responsible for determining which network element is to receive a message from another network element.

Figure 2:
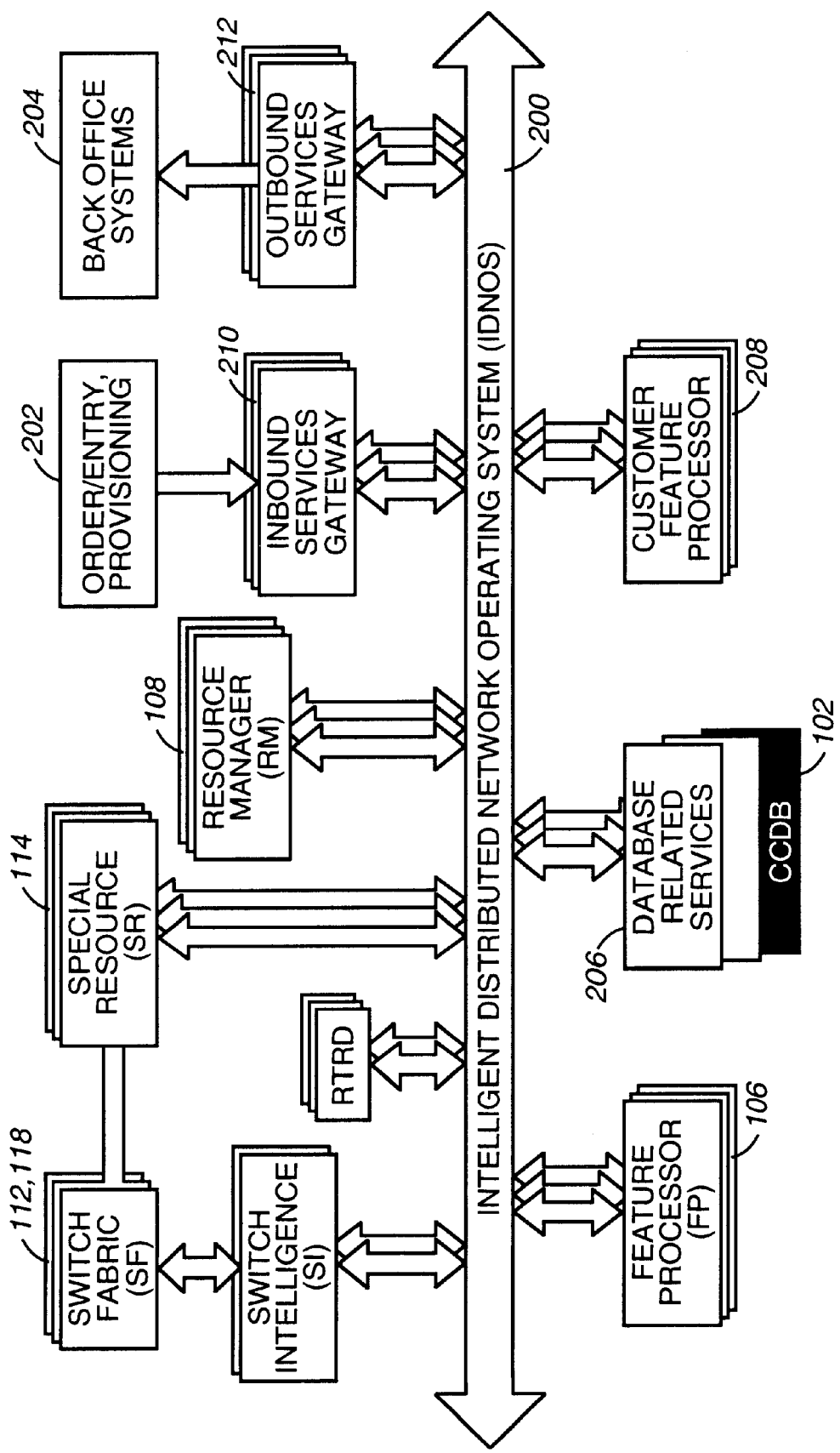
FIG. 2 is a diagram that illustrates logical call-flow relationships among the functional network elements depicted in FIG. 1 via an intelligent distributed network operating system.

Referring now to FIG. 2, is a diagram that illustrates logical call flow relationships among the network elements depicted in FIG. 1 via an IDNOS. In particular, FIG. 2 illustrates logical message passing through an IDNOS 200 between the structures illustrated in FIG. 1. Additionally, FIG. 2 illustrates an inbound services gateway 210, and an outbound services gateway 212 which are used to provide an interface to external systems which may support inbound and outbound services. Inbound services may include order entry and provisioning as identified at block 202. Accordingly, CCDB 102 may be used as a single network repository for caller services, privileges, and authorization information. Outbound service such as back-office system services (identified at block 204) are described below in regard to FIG. 5.

Also shown in FIG. 2 are database related services 206 and other customer feature processors 208. These structures and the logical interaction of the same will be readily understood by those skilled in the art.

The network elements within IDNA 100 communicate with each other over a data network that includes routers, bridges, packet switches, databases and directories. The IDNOS 200 provides a vehicle for using the data network for communications among the network elements. Additionally, another communications vehicle is used between SF and SR components. This other communications vehicle represents the actual voice trucks of the traffic-bearing network that is used to transfer calls from switches to special resources such as VRUs, etc.

Accordingly, in FIG. 2, IDNOS 200 will facilitate the communications of data, for example, between a feature processor (e.g., FP 106), a special resource, and CCDB 102.

Figure 3:
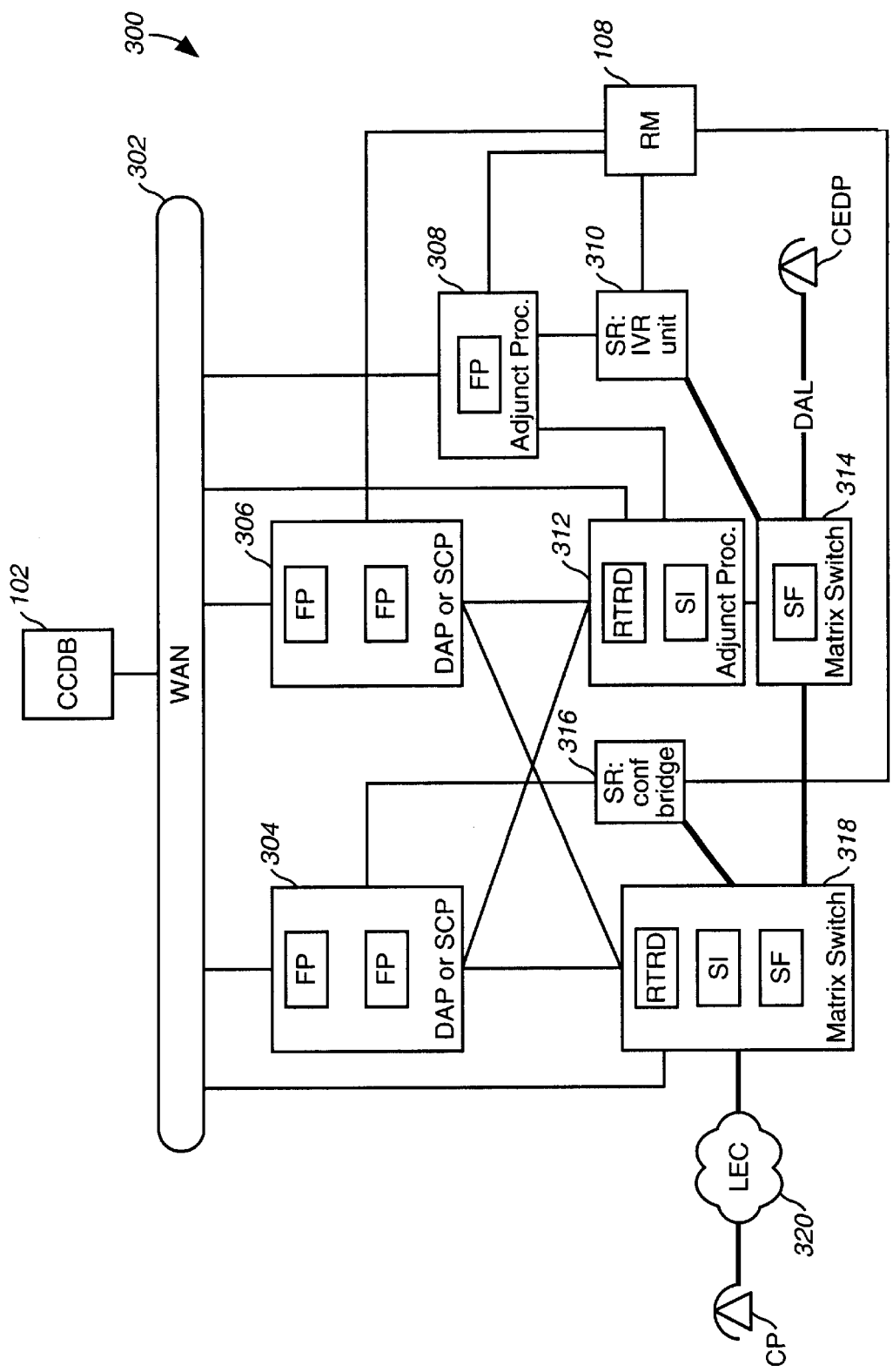
FIG. 3 is diagram that illustrates an exemplary mapping of the functional network elements depicted in FIGS. 1 and 2 to particular physical network elements within a telecommunications network.

Referring now to FIG. 3, depicted therein is a diagram that illustrates an exemplary mapping of the functional elements depicted in FIGS. 1 and 2 to particular physical network elements within a telecommunications network. A telecommunications system 300 is one that may be operated by an inter-exchange carrier.

Telecommunications system 300 includes and involves CCDB 102, a WAN 302, one or more DAPs/SCPs (Data Access Points/Service Control Points) 304, 306, RM 108, an adjunct processor (AP) 308, an SR IVR (independent voice response unit) 310, an AP (312), one or more matrix switches 314, 318, and a local exchange carrier 320.

In telecommunications system 300, call flows are illustrated by broad connecting lines, while data flows are illustrated by narrower connecting lines. Such call flows may be implemented as voice trunks. Data flows within telecommunications system 300 may implemented as out-of-band signaling links similar or like SS7 signaling links which will be readily understood by those skilled in the art.

In telecommunications system 300, an SF function is provided by a digital matrix switch such as matrix switch 318. The SI function may be incorporated into the same physical component as the SF, but typically is embodied within an Adjunct Processor (AP) (e.g., AP 308). The SI functionality spans across AP 308 and a matrix switch (e.g., Matrix Switch 314, 318). As shown, an RTRD may also be incorporated into a matrix switch, but preferably, is maintained in an adjunct processor like AP 312. The RTRD within AP 312 receives a query from the SI for each call received on a SF, and then determines which other element (s) (i.e., which DAP(s) and FP(s)) should process the call.

Typically, FPs are deployed as DAPs or SCPs. An FP may also be deployed as an AP. The SRs are computer/telephony platforms that are connected via voice trunks to a switch. The SRs are controlled by FPs or SIs. An RM must track availability of SR resources, and provide information to associated FPs. An RM may be implemented as a high performance computer or computing platform which is well known by those skilled in the art.

In telecommunications system 300, each network element has access to CCDB 102 via WAN 302. The WAN 302 may be the same WAN that is used by other elements to communicate with each other. Alternately, WAN 302 may be implemented as a distinct and separate network backbone.

The CCDB 102 is a computer or computing platform that embodies a database, a database management system or database server along with a communications interface to provide centralized management of call context data. The CCDB 102 may be implemented as a single processing component, as a redundant plurality of computing systems, or as a partitioned plurality of computing systems (e.g., segmented NCID values across plural database management systems). A redundant plurality of computing systems will cooperate with each other to provide data redundancy and fault tolerance. A redundant plurality of cooperating computing systems may be further segmented into a primary group of one or more computing systems and a secondary group of one or more computing systems. Such secondary computing systems may be used as backup systems or as load balancing systems which utilize standard database synchronization techniques and approaches to allow effective redundancy. A partitioned plurality of computing systems is one in which two or more cooperating computing systems make up CCDB 102 and each computing system manages data related to a certain range of network call identifiers (NCIDs). A plurality of computing systems is preferred for backup and fault tolerance purposes.

As a further alternative to implementing CCDB 102 as a standalone service device or arrangement of cooperating computing systems, CCDB 102 may be implemented using other structures within IDNA 100. Such an alternate arrangement is shown in FIG. 4.

Accordingly, although the use of the term "central" or any modified form of that term (e.g., "centralized") normally would imply that data, for example, would be stored in one, generally accessible place, the present invention has modified the meaning of the term. In context of the present invention, "central" is meant to refer to the singular and logical nature of a data source and not necessarily its physical location or implementation. Thus, a central call context database according to the present invention is one that may be maintained in one physical location (e.g., resides on a disk farm associated with a particular computing system) or in more than one location such as networked data storage facilities that may be addressed logically as a single source of call context data.

Figure 4:
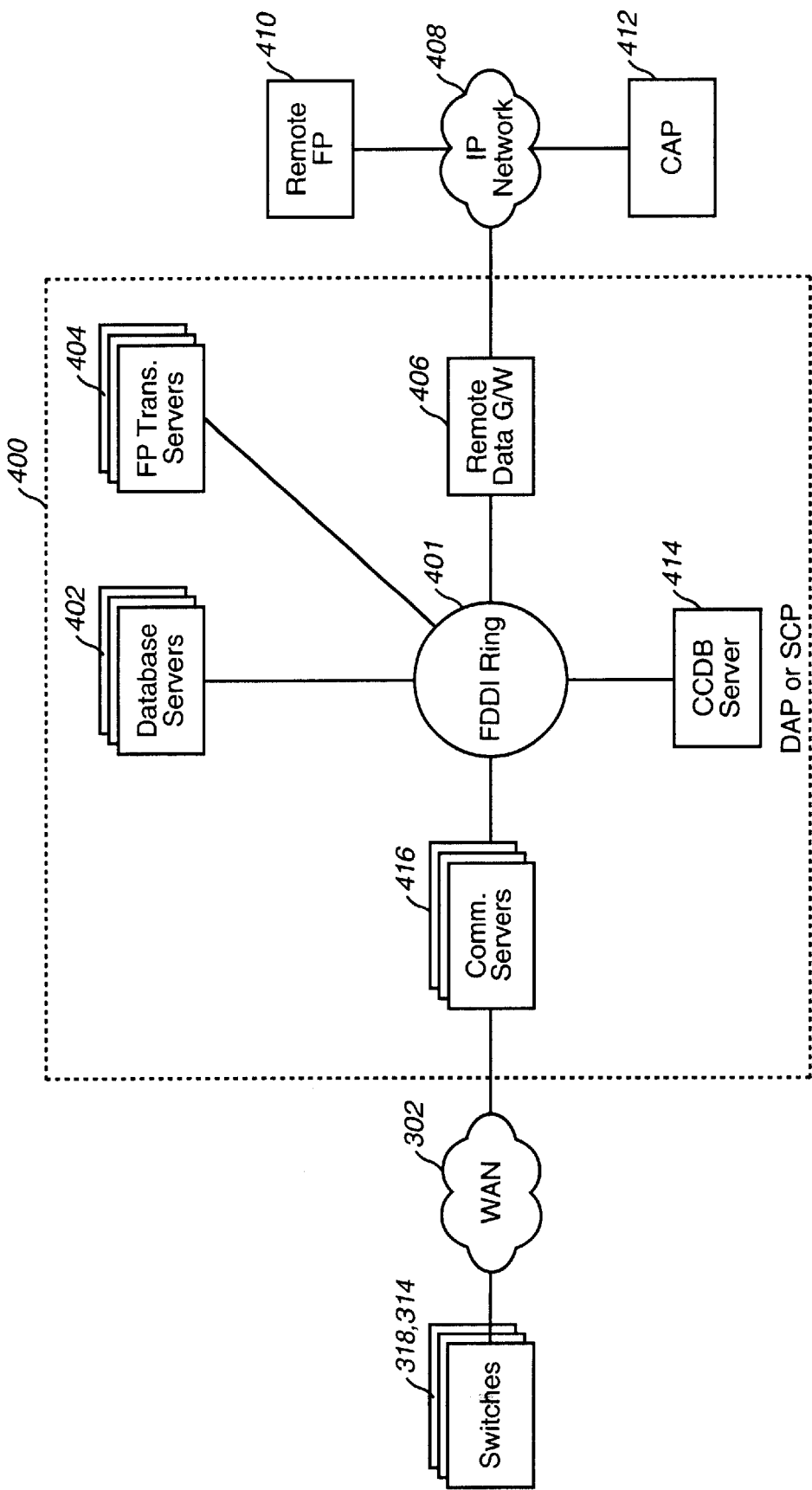
FIG. 4 is a block diagram of a call context database management system configuration according to another preferred embodiment of the present invention.

Referring now to FIG. 4, depicted therein is a block diagram of a call context database management system implementation according to another preferred embodiment of the present invention. In particular, a DAP 400 (denoted by the box formed by a dashed line) is coupled to WAN 302 (discussed above in regard to FIG. 3 above), switches 318, 314 (discussed above in regard to FIG. 3), an IP network 408 (discussed in greater detail below in regard to FIG. 6), a remote FP 410, and a Customer Access Point (CAP) 412.

The DAP 400 includes conventional components and, according to the present invention, a CCDB server 414. That is, DAP 400 includes database servers, FP transaction servers 404, remote data gateways 406, and communications servers 416 which will be readily understood by those skilled in the art. As such, DAP 400 includes a collection of computers and computing systems which are linked via an FDDI ring 401 network. A plurality of communication servers 416 provide an interface between the other servers of DAP 400 and network switches 318, 314. A plurality of FP transaction servers 404 perform application processing to provide various services of an FP. These transactions include routing translations, rules-based routing, call destination load balancing and algorithmic processing, and termination availability monitoring. A plurality of database servers manage the databases needed for various services, such as local number portability and international routing. Remote data gateway 406 provides DAP 400 with an interface to communicate with remote FPs 410 and customer access points (CAPS) like CAP 412. Accordingly, remote data gateway 406 enables call processing to be performed by other network elements such as remote FPs, customer FPs/SCPs, etc. Remote data gateway processing is described in co-pending U.S. patent application Ser. No. 08/796,246 which is commonly assigned to the owner of the present invention.

The CCDB server 414 within DAP 400 can be implemented as a database server that is linked to FDDI ring 401. Accordingly, CCDB server 414 as implemented within DAP 400 is accessible by other network elements via WAN 302 which couples the switch network and DAP 400. The CCDB 414 as implemented within DAP 400 will store and manage (and serve) call context data as generated and requested by network elements such as those described above in regard to FIG. 1.

It should be understood that various other types of new and specialized network elements can use a CCDB according to the present invention for both reading and writing of call context data. For example, as shown in FIG. 4, a CAP that may be located at a customer site may be arranged to address and utilize a CCDB according to the present invention.

In addition to the foregoing comments regarding the inbound services and real-time data loading of the CCDB, other inbound services may be implemented for a CCDB according to the present invention. Such other inbound services include order entry and provisioning systems that may be provided with a data feed into a CCDB via an inbound services gateway. This would allow a CCDB to be pre-populated with data specifying which services and privileges are available to a caller or group of callers. Accordingly, since a CCDB according to the present invention contemplates a single network repository for such user information, multiple destination addresses for order entry and provisioning feeds are not needed.

The discussion presented above is concerned with the deployment of a CCDB like CCDB 102 to centrally store and manage call context data within an IDNA like IDNA 100. The management of such call context data includes the central storage and retrieval of call context records related to network element operation and the creation of NER records by such network elements. A centralized call context database as provided by the present invention may be used both during real-time call processing to properly route and service calls, and during outbound service processing to facilitate efficient and effective IDNA management and operation. For example, since a CCDB according to the present invention includes all data pertinent to a call and to multiple calls that are to be commonly billed, it is useful as a single source of data for any back-office system that may be used to operate a management system that is to engage in real-time and batch processing related to call context data.

Figure 5:
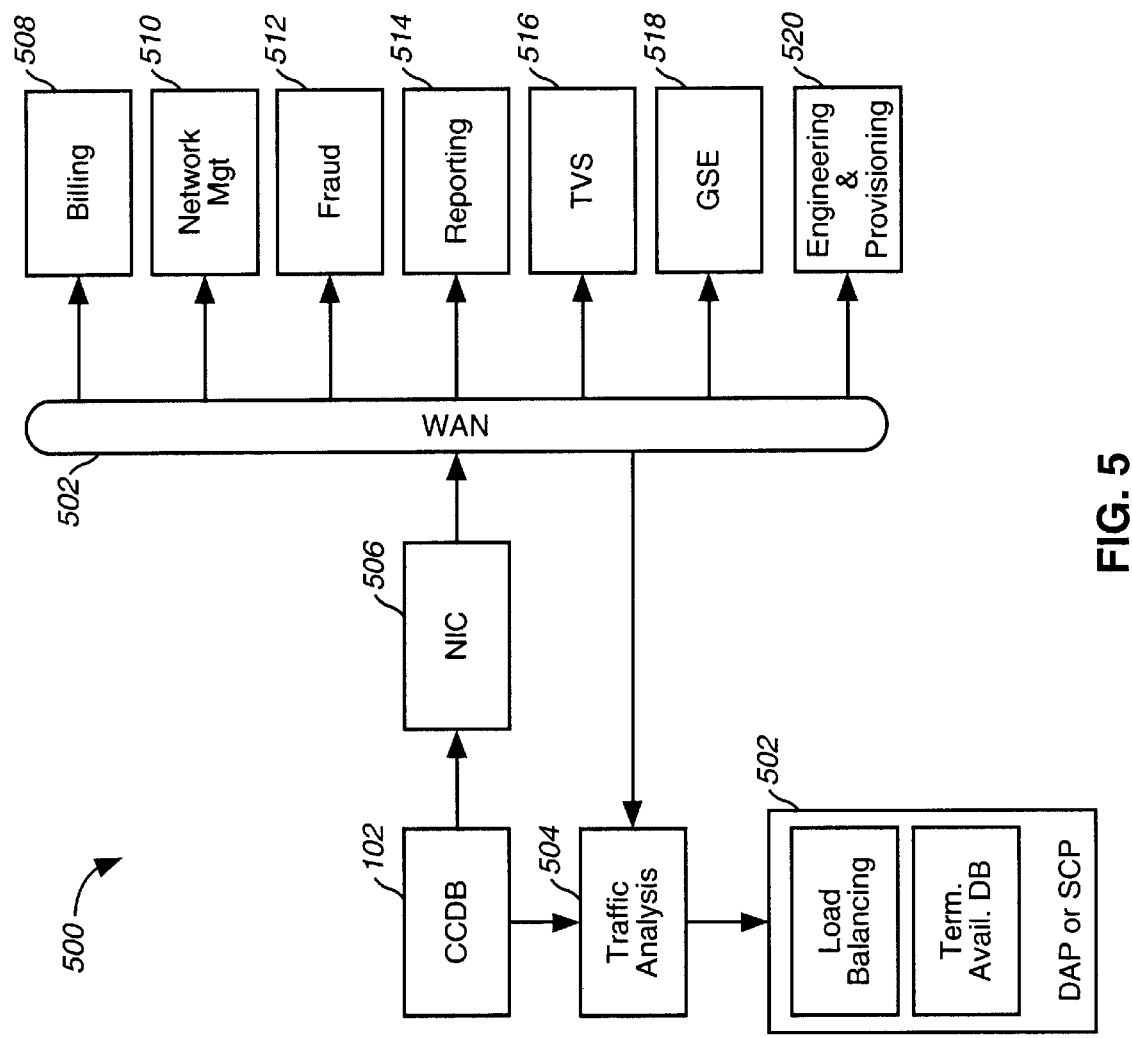
FIG. 5 is a block diagram of a system in which outbound services are supported via a call context database management system according to a preferred embodiment of the present invention.

A typical back-office arrangement is shown in FIG. 5 to which reference is now made. FIG. 5 illustrates a block diagram of a system in which outbound services are supported via a centralized call context database management system according to a preferred embodiment of the present invention. The central nature of CCDB 102 in system 500 allows back-office management processes to be efficiently and effectively carried out. In particular, in system 500, CCDB 102 supports a Network Information Concentrator sub-system (NIC) 506, a traffic analysis system that further supports a DAP/SCP 502, a billing system 508, a network management system 510, a fraud detection system 512, a reporting system 514, a traffic view server (TVS) system 516, a general statistics engine (GSE) 518, and engineering and provisioning systems 520. These supported systems are further described below. The arrows within FIG. 5 indicate flows of data as a result of queries (real-time or otherwise).

The NIC 506 is a computing system that collects all records generated within an IDNA after call completion, correlates multiple records for a single call or service instance based on certain conditions, and provides such records to downstream systems via one or more WANs like WAN 502. The CCDB may be implemented as an enhancement to NIC 506. The CCDB 102 provides a collection of all call data generated within an IDNA and correlates that data for a single call or service instance into a call context record, while a call is in progress. The CCDB 102 also provides call context records comprising all data pertinent to a call (as discussed above in regard to FIG. 1) to NIC 506. The NIC 506 provides the processing necessary to distribute records to appropriate clients.

Traffic analysis systems 504 are deployed in system 500 to perform load balancing and termination availability functions for customers with multiple network destination, such as call centers. Traffic analysis systems 504 analyze call context data to determine which destinations are available and can take inbound calls. Additionally, systems 504 determine the current load of each destination for the purpose of balancing loads. Accordingly, systems 504 serve as FPs that perform rules-based routing of calls. Systems 504 can get call context data from a direct link to CCDB 102 (e.g., if systems 504 reside on a transaction server on a DAP), from the network WAN shown in FIG. 3, or from WAN 502. The CCDB 102 provides a central source of all data needed by traffic analysis systems 504 which may operated in real-time.

Billing systems 508 may be deployed relative to all network call data via CCDB 102. Since data are consolidated and centralized in real-time on CCDB 102, post-call completion processing performed by NIC 506 is reduced, thereby providing more timely data feeds to billing systems 508. For complex services like conference calling, in which multiple network calls are to be billed to a single customer as a single item, CCDB 102 provides all network data needed for this function in a single ready-to-use record. Another advantage of the real-time nature of the data stored by CCDB 102 is the ability to support pre-paid calling cards and other real-time billing features.

Network management systems 510 require data reflecting the performance of the network. Much of these data are obtained from call data, and may be provided directly from CCDB 102. Fraud detection systems 512 may also use call data provided directly from CCDB 102. The real-time view of active calls that is provided by CCDB 102 gives fraud detection systems the information needed for early detection of fraud. Consolidated call data that results from completed calls can undergo further analysis to help detect fraud that is difficult to identify and that is new to an IDNA.

Reporting systems 514 include systems that generate customer and internal use reports. Such reports include both batch reports and real-time reports. For example, TVS 516 utilizes reporting systems 514 and data retrieved from CCDB 102 to provide customers with real-time monitoring of call activity as well as batch reports.

General Statistics Engine (GSE) systems 518 provide call statistics that are used by other systems such as reporting systems and engineering and provisioning systems. The GSE systems 518 collect call data from CCDB 102 and then compile statistics that may be used for management reporting and control.

The aforementioned discussions are primarily concerned with providing a centralized call context database within an IDNA that is coupled to conventional circuit-switched networks such as the publicly switched telephone network. The present invention, however, is concerned with providing a centralized call context database and management system that may be used to more efficiently and effectively route and service calls within an IDNA. Accordingly, the present invention is not to be restricted to a circuit-switched telephone network. To the contrary, a CCDB may be used within a packet-switched network like or similar to an Asynchronous Transfer Mode (ATM) network. The ATM networks are being deployed for Internet backbones and other types of networks. It is expected that an ATM-based Internet will soon be used for voice telephony services, combining voice, video, and data traffic on a single network. A CCDB, according to the present invention, may be used within such a network in the same way as described for a circuit-switched network. The first network element that receives a call may assign a NCID to the call and thereafter creates a call context record on the CCDB using the NCID. The NCID is then passed with the control of the call to successive network elements. Each network element queries the CCDB with the NCID to retrieve call context data as needed.

Additionally, it should be noted that there is no requirement that a CCDB according to the present invention be placed into a homogeneous network architecture. Instead, the present invention certainly contemplates the installation of a CCDB along with the generation of NCIDs and corresponding NERs in networks that include heterogeneous architectures. Accordingly, the present invention may be incorporated into networks that include both digital packet-switched sub-networks and circuit-switched networks.

Figure 6:
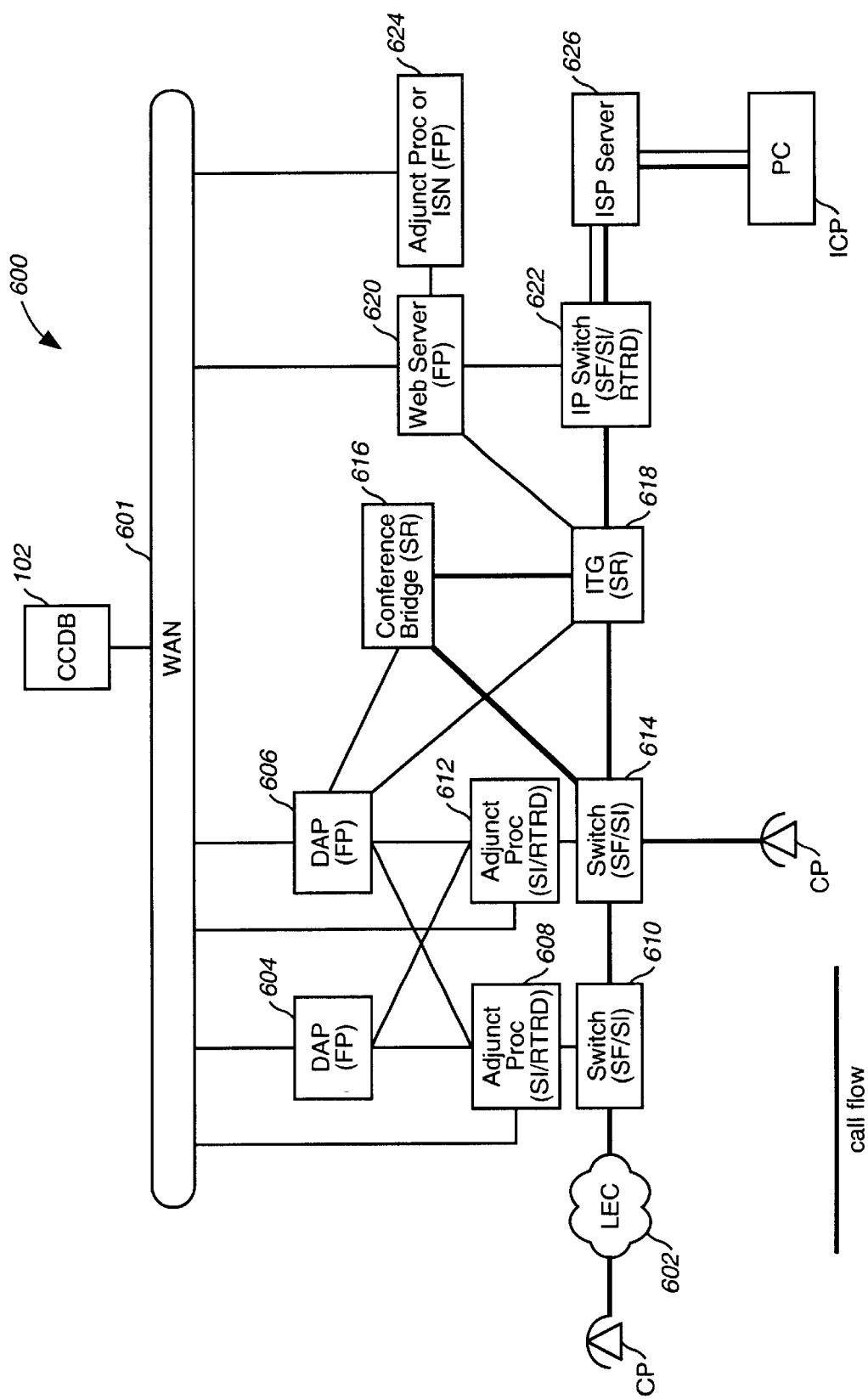
FIG. 6 is a block diagram of an intelligent network architecture in which a centralized call context database is managed to facilitate call processing related to calls that originate via the Internet according to another preferred embodiment of the present invention.

Referring now to FIG. 6, depicted therein is a block diagram of another intelligent network architecture in which a centralized call context database is managed to facilitate call processing related to calls that originate via the Internet according to preferred embodiment of the present invention. In particular, system 600 includes and involves calling parties CP, CCDB 102, a WAN 601, a LEC 602, a DAP 604, an AP 608, a switch 610, a DAP 606, an AP 612, a switch 614, a conference bridge 616, an Internet Telephony Gateway (ITG) 618, a Web Server 620, an IP switch 622, an AP 624, an ISP Server 626, and a client station (ICP) (Personal Computing system equipped with an Internet Telephony Capability). With the exception of CCDB which is described and defined herein, the arrangement of the other structures and parties within system 600 will be immediately understood by those skilled in the art.

In system 600, call flows are illustrated by broad connecting lines, while data flows are illustrated by narrower connecting lines. Such call flows may be implemented as voice trunks. Data flows within IDNA 100 may be out-of-band signaling links similar or like SS7 signaling links and IP links which will be readily understood by those skilled in the art.

In system 600, execution of an Internet client package may be used to place a telephone call via the Internet. The ISP Server provides access to the Internet which is represented by IP Switch 622. The IP Switch provides SF, SI, and RTRD functions. To place a telephone call, a caller with a personal computer (PC) accesses Web Server 620 which provides FP functionality. Web Server 620 validates the caller and then sets up a telephone call over the PSTN by establishing a session with ITG 618. Alternately, Web Server 620 may interface with AP 624 or other Intelligent Services Network (ISN) (not shown) for FP functionality needed to validate the caller and to set up an telephone call via ITG 618. In any case, the FP that validates the caller and sets up the call creates a call context record by sending an NER to CCDB 102. Thereafter, when a switch on the PSTN receives the call, for example, the switch can query the CCDB (via a NCID) to obtain all data that has been collected on the call. Such operation eliminates the need for specialized communications channels between the Internet network elements and the PSTN network elements.

A conference call among PSTN callers and Internet callers may also be performed. Each call, whether initiated via the PSTN or via the Internet, is routed to conference bridge 616. Internet callers such as ICP ca be routed to the conference bridge directly from ITG 618 or via another switch. For example, during a conference call, a caller can enter a DTMF input like "9" thereby signaling a request to originate a call to a new conference participant. The conference bridge detects the DTMF input and sends a message to the FP (e.g., DAP 606). The DAP 606 references the call's call context record in CCDB 102 via the NCID. The call's call context record in CCDB 102 can be located via a new query. From such a query, the FP determines that DTMF=9 is request to link another participant and solicits from the caller an address. The call can provide an Internet address (or telephone number, etc.). The FP (e.g., DAP 606) establishes a link from the conference bridge to ITG 618 and then establishes an IP session from ITG 618 to the requested participant who is connected to the Internet via his PC. The new participant can now join the conference. The FP (DAP 606) writes an NER to CCDB 102 that reflects the new call leg of the bridged conference call.

OPERATIONAL ASPECTS OF THE PRESENT INVENTION

Figure 7A:
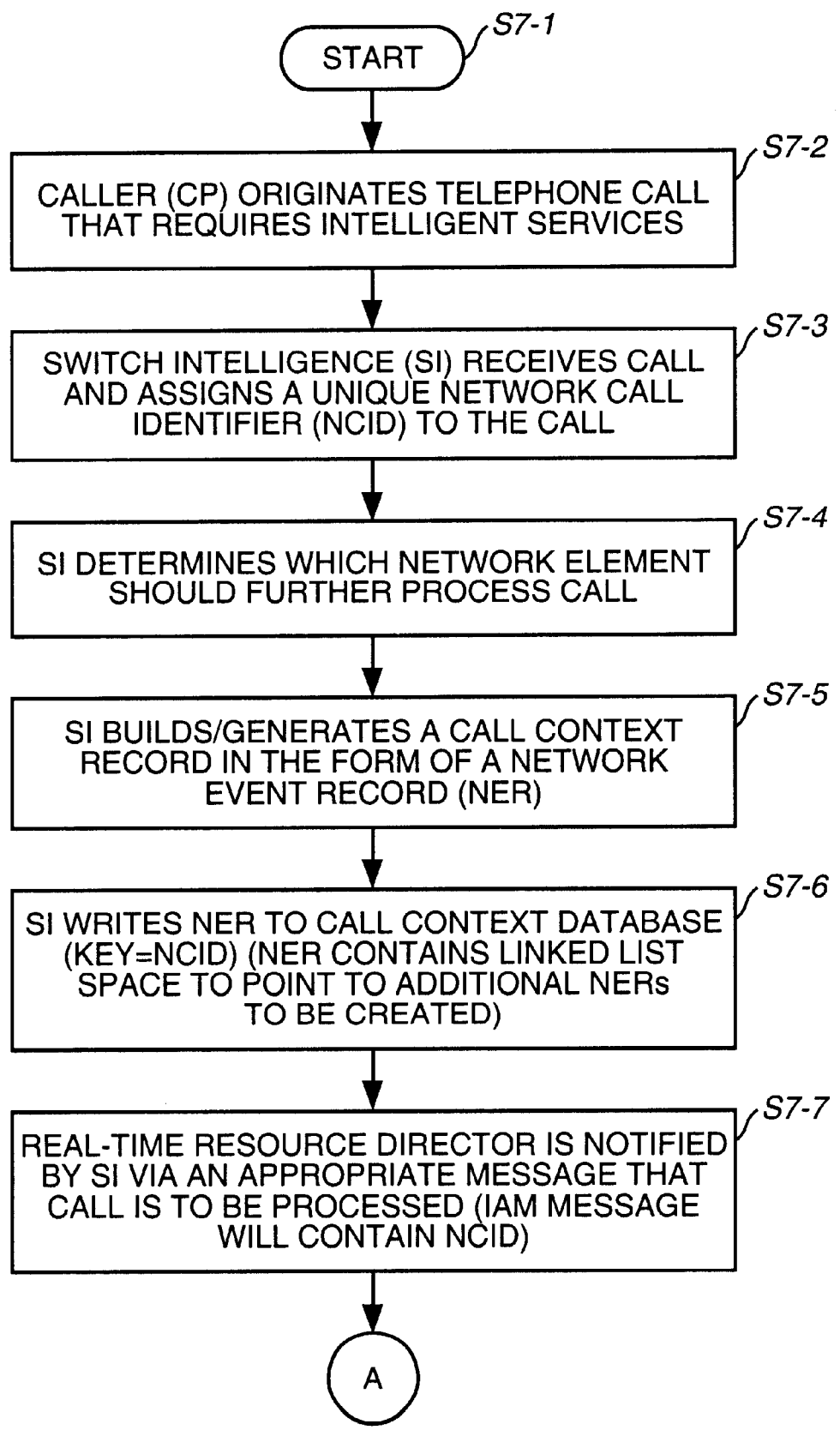
FIG. 7A is a flowchart that illustrates generic call processing within an intelligent distributed network architecture through use of a centralized call context database.
Figure 7B:
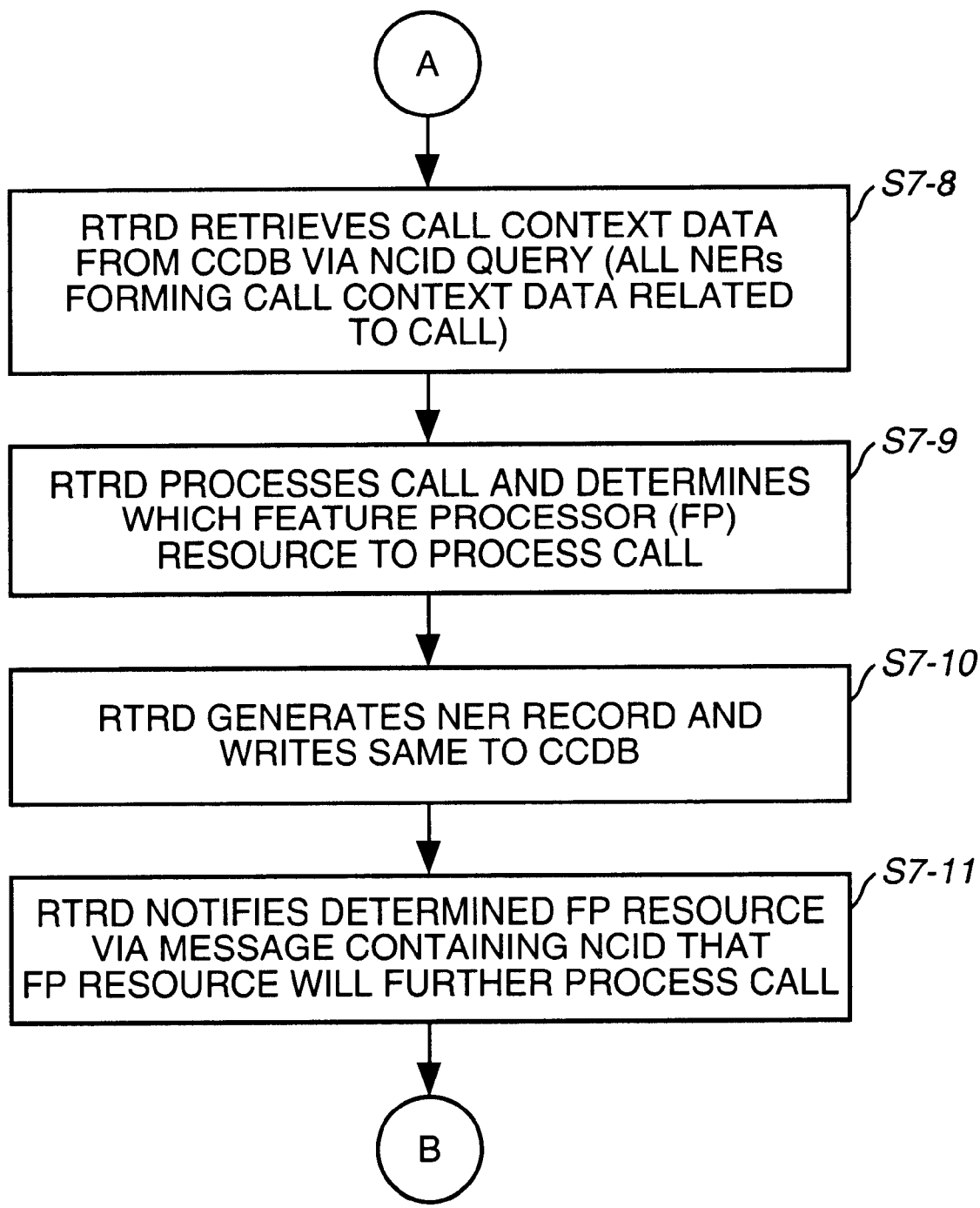
FIG. 7B is a continuation flowchart of the flowchart started in FIG. 7A.
Figure 7C:
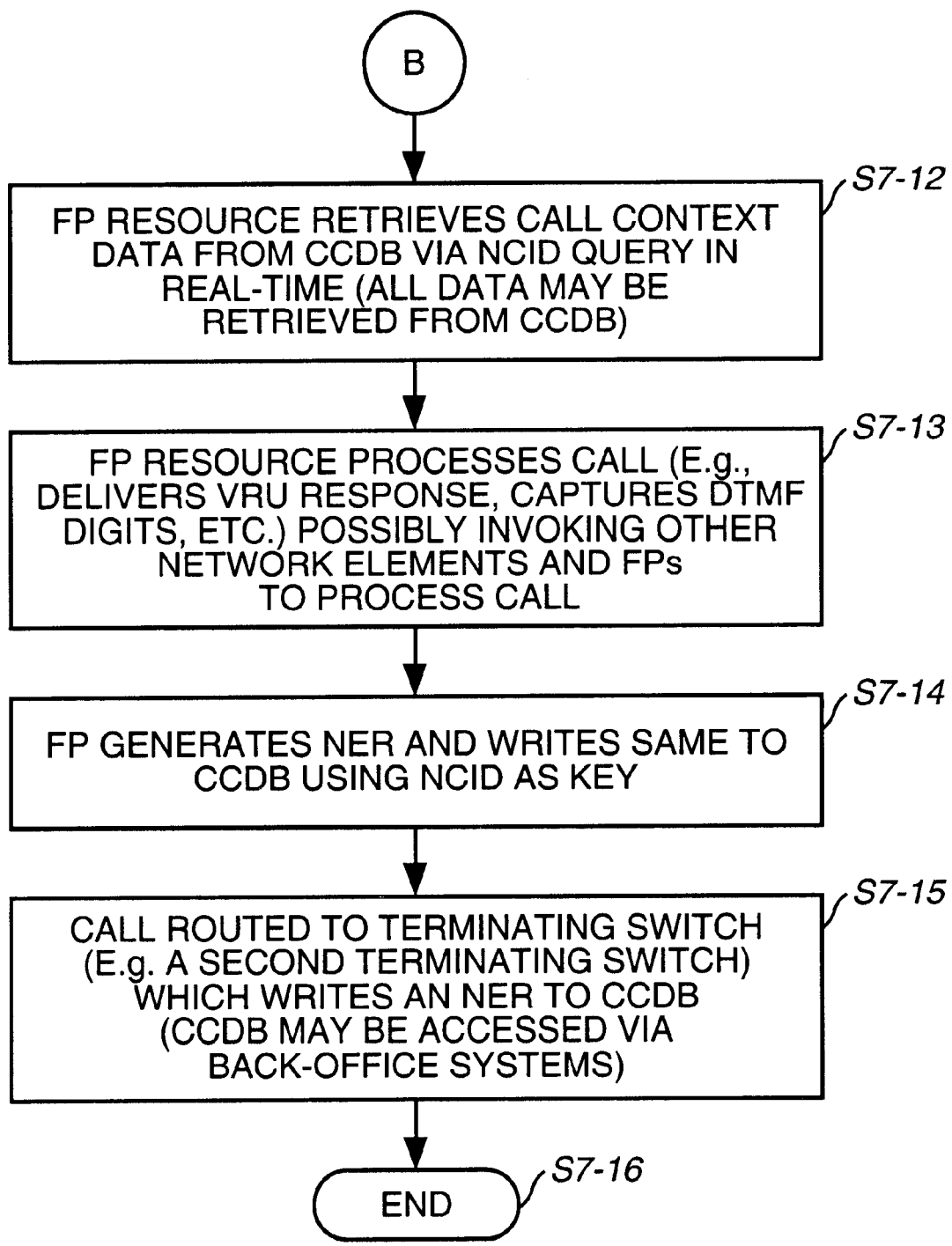
FIG. 7C is a continuation flowchart of the flowchart started in FIGS. 7A and 7B.

The structures depicted in FIGS. 1–6 are configured to operate together to facilitate intelligent network call processing through use of a centralized call context database. Exemplary and salient operations to bring about such functionality are illustrated in FIGS. 7A–7C. Many of the operations depicted in FIGS. 7A–7C, are intended to be carried out, as indicated above, via computer software. Such computer software and, in particular, the programming constructs necessary to bring about such operations will be readily apparent to those skilled in the art after reviewing and understanding the operations illustrated in FIGS. 7A–7C and described below.

Referring now to FIGS. 7A–7C, depicted therein is a flowchart that illustrates generic call processing within an intelligent distributed network architecture through use of a centralized call context database. The operations illustrated in FIGS. 7A–7C may be carried out in the context of many different call processing functions and intelligent telecommunications services (e.g., direct calling, conference calling, Internet telephony, prepaid telephone card calling, etc.). In some instances, processes may be iterated to effect special call processing results such as call conferencing (the establishment of a linked super call identifier to be associated with NCID for each call leg forming a conference call).

The following processes reference the structures mentioned in FIG. 1, but are in no way restricted to the implementation shown therein.

Processing starts at Step S7-1 and immediately proceeds to Step S7-2. At Step S7-2, a caller (calling party) originates a telephone call that is destined to be processed by an IDNA like IDNA 100 in FIG. 1. Next, at Step S7-3, switching intelligence (e.g., SI 110) acknowledges the call at a switch (e.g., SF 12 as the access switch) and assigns a unique network call identifier or NCID to the call.

Next, at Step S7-4, SI 110 determines which network element should further process the call. At Step S7-5, SI 110 builds a call context record for the call in the form of a network event record (NER) related to the switch currently processing the call. The NER record will contain the NCID, calling station parameters (e.g., ANI data), network element processing parameters (e.g., data about network processing including error conditions, status flags, etc.), and space for linked-list data to associate the initial NER to other NERs that will be created by additional network elements that will be involved in processing the call.

Thereafter, at Step S7-6, the switch currently processing the call (e.g., the access switch—SF 112) writes the NER to CCDB 102. Such a write operation may be carried out using put processes or other high-speed messaging and the like which will be readily apparent to those skilled in the art. The NER and all NERs that follow will form the call context data related to the call and will be addressable within CCDB based upon the NCID as the key to the call context data.

Next, at Step S7-7, SI 110 notifies RTRD 104 that it is to further process the call. Such notification will take the form of a message containing the NCID for the call.

Next, at Step S7-8 at the top of FIG. 7B, RTRD 104 retrieves the call context record from CCDB 102 via a NCID-based query. At Step S7-9, RTRD 104 processes the call and determines which feature/function processor (FP resource) is to further service and process the call (e.g., a voice response unit, an ITG, etc.).

At Step S7-10, RTRD 104 generates its NER record and writes the same to CCDB 102. Thereafter, at Step S7-11, RTRD 104 notifies a determined FP resource (e.g., FP 106) that it is to further process the call. The notice to FP 106 includes the NCID for the call.

It is important to note that if a conference call processing is to be carried out, FP 106 can create and maintain a SCID to associate NCID for all call legs into a bridged call. Such association may be carried out via a database within FP 106.

Next, at Step S7-12 at the top of FIG. 7C, the FP 106 will retrieve call context data from CCDB 102 as a result of an NCID-based query. Thereafter, at Step S7-13, FP 106 processes the call (including the invocation of other services provided by other network elements).

Next, at Step S7-14, FP 106 generates a NER and writes the same to CCDB 102 using the NCID for the call.

Finally, at Step S7-15, a second switch (e.g., SF 118) terminates the call and writes an NER to CCDB 102 to support back-office processing.

Processing ends at Step S7-16.

When conference calling is the service being offered in the context of the call processing steps discussed above, CCDB 102 can efficiently effectuate the same. In such a case, a call context record is created on CCDB 102 for each call leg into or part of a conference bridge (a special resource configured to manage bridged call legs—a switch capable of supporting conference bridging). The CCDB 102 then links the NCID of each call, so that each caller has the same available feature set. An SCID is assigned to each linked NCID. This allows the calls to be correlated for billing, so that multiple calls into the conference may be billed as a single item to a single customer.

The assignment of an SCID also may be used to implement a conference bridge on a switch (SF/SI). Each call into a network switch is first processed by an FP and linked by NCID into a single call context record stored and managed by CCDB 102. Each call is then routed to a common switch and bridged thereby. The FP instructs the switch to monitor for DTMF inputs by callers. A DTMF signal input is commonly used by a caller to request another service, such as operator assistance or call re-origination, etc. The conference will then proceed on the bridged switch. As such, the same features are available to each caller on the conference since each call (or leg of the conference call) has the same call context record. This is a distinct advantage to using a NCID/SCID addressable CCDB like CCDB 102.

Moreover, if a partitioned plurality of CCDB systems are used (as described above in regard to FIG. 3), each network element will preferably include NCID translation tables to select appropriate CCDB addresses to which to write NERs. If a redundant plurality of CCDBs is used, IDNOS (FIG. 2) selects a closest CCDB to which to write NERs. When translation tables and the like are used to distribute NCID information, traditional mirroring and data backup techniques may be used to distribute up-to-date lookup values.

Also, an SI/SF network element writes an NER using the NCID. The SI/SF element is not concerned with writing SCIDs. In fact, the SI/SF network element can write more than one NER for a call, depending on how NERs are defined. For example, a switching element may write one NER upon receiving a call on an inbound port, and another NER upon transmitting a call out on an outbound port.

An FP always writes an NER when finished with a call. The FPs are responsible for creating SCIDs since FPs render complex services such as conference calling and the like. An FP is also responsible for linking NCIDs to SCIDs. To do this, an FP may have its own database. An FP can use call context data retrieved from CCDB 102 as a key to storing and retrieving data relative to its own database.

In the foregoing discussion of the operations illustrated in the flowcharts of FIGS. 7A–7C, and in above-presented discussion of the structural aspects of the present invention, there have several references to network event records (NERs) as forming the basis of a centrally stored call context record maintained within a centralized call context database (CCDB). An exemplary NER record is shown in FIG. 8 to which reference is now made.

In FIG. 8, a NER 800 includes several pieces of data including a network call identifier (NCID), calling station parameters (e.g., ANI, etc.), call processing parameters (e.g., billing data, call routing data, etc.), caller entry data (e.g., keyed DTMF sequences in response to VRU queries, etc.), a pointer to a next network event record to form a linked list of NERs, etc. The blocks containing ellipses indicate that other data may be included within the call context data and, in particular, within an NER that is stored in a call context database and which is managed by a call context database management system according to the present invention. The content of NER 800 may include strings of data (e.g., strings of bytes or words) that represent particular data items. The exact nature and structure of NER 800 may vary depending on particular design requirements and the like. All that is required is that the structure of an NER be consistent and/or known throughout an addressing system of an IDNA so that numerous network elements may utilize the NER/NCID scheme provided by the present invention for call processing and service provisioning. Accordingly, although NER has a particular structure (field structure), other data structure arrangements may be used including table-based structures, delimited structures, messaging structures, etc.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for processing calls in a telecommunications system, comprising:
   a call context database;
   an intelligent telecommunications network coupled to said call context database;
   a plurality of network elements incorporated in said intelligent telecommunications network, each network element operative to generate call context data;
   a network call identifier related to a call within said telecommunications system;
   storage means associated with said call context data and operative to store said call context data and said network call identifier therein;
   retrieval means operative to retrieve said call context data from said call context database based on said network call identifier; and
   a processor operative to process said call in accordance with said call context data,
   wherein said call context database is distributed among a plurality of cooperating call context database management systems that are coupled to the intelligent telecommunications network, and
   wherein each cooperating call context database management system of the plurality of call context database management systems manages a subset of the call context database, the subset of the call context database corresponding to a range of network call identifiers.

2. The system according to claim 1, wherein said call context database is managed by a centralized call context database management system that is coupled to said intelligent telecommunications network.

3. The system according to claim 1, wherein each cooperating call context database management system of said plurality of cooperating call context database management systems is redundant to other cooperating call context database management systems of said plurality of call context database management systems.

4. The system according to claim 1, wherein said network call identifier is a unique identifier assigned to said call.

5. The system according to claim 1, wherein said call context data includes data generated automatically in real-time by said network element in response to receiving and processing said call.

6. The system according to claim 1, wherein said call is placed by a caller and said call context data includes data retrieved from said caller during said call.

7. The system according to claim 1, wherein one network element of said plurality of network elements acts as an access network element for said call, said access network element operable to assign said network call identifier to said call.

8. The system according to claim 1, wherein each network element of said plurality of network elements is further capable of transmitting said network call identifier to other network elements of said plurality of network elements and receiving said network call identifier from another network element of said plurality of network elements.

9. The system according to claim 1, further comprising a management system capable accessing said call context database after completion of said call to perform a management function related to said call context data.

10. The system according to claim 9, wherein said management function is a billing operation related to said call.

11. The system according to claim 1, further comprising a management system capable of accessing said call context database during said call to perform a management function related to said call.

12. The system according to claim 11, wherein said management function is a statistical analysis operation related to said call.

13. A system for processing calls in a telecommunications system, comprising:
   a call context database; and
   an intelligent telecommunications network coupled to said call context database;
   an access network element incorporated in said intelligent telecommunications network and operative to receive a call and generate first call context data and a network call identifier related to said call;
   storage means associated with said call context database and operative to store said first call context data and said network call identifier in said call context database;

a plurality of network elements coupled to said call context database and said access network element, each network element of said plurality of network elements operative to receive said call from said access network element and to generate second call context data related to said call and said network call identifier related to said call within said telecommunications system;

storage means associated with said call context database and operative to store said call context data and said network call identifier therein;

retrieval means operative to retrieve said call context data from said call context database based on said network call identifier;

a processor operative to process said call in accordance with said call context data; and a plurality of cooperating call context database management systems, each of the plurality of cooperating call context database management systems coupled to the intelligent telecommunications network and configured to manage a subset of the call context database, the subset of the call context database corresponding to a range of network call identifiers, wherein the call context database is distributed among the plurality of cooperating call context database management systems.

14. The system according to claim 13, wherein said call context database is managed by a centralized call context database management system that is coupled to said intelligent telecommunications network.

15. The system according to claim 13, wherein each cooperating call context database management system of said plurality of cooperating call context database management systems is redundant to other cooperating call context database management systems of said plurality of call context database management systems.

16. The system according to claim 13, wherein said network call identifier is a unique identifier assigned to said call by said access network element.

17. The system according to claim 13, wherein said call context data includes data that is generated automatically.

18. The system according to claim 13, wherein said call is placed by a caller and said call context database stores data retrieved from said caller during said call.

19. A method for processing calls in a telecommunications network, comprising:

receiving a call;

generating call context data and a network identifier related to said call;

storing said call context data and said network call identifier in a call context database;

retrieving said call context data from said call context database based on said network call identifier; and processing said call based on said call context data, wherein said call context database is distributed among a plurality of cooperating call context database management systems that are coupled to the telecommunications network, and wherein each cooperating call context database management system of the plurality of call context database management systems manages a subset of the call context database, the subset of the call context database corresponding to a range of network call identifiers.

20. The method according to claim 19, wherein said call context database is managed by a centralized call context database management system that is coupled to said telecommunications network.

21. The method according to claim 19, wherein each cooperating call context database management system of said plurality of cooperating call context database management systems is redundant to other cooperating call context database management systems of said plurality of call context database management systems.

22. The method according to claim 19, wherein said network call identifier is a unique identifier assigned to said call by an access network element coupled to said telecommunications system.

23. The method according to claim 19, wherein said call context data includes data generated automatically in real-time during said call.

24. The method according to claim 19, wherein said call is placed by a caller and said call context data includes data retrieved from said caller during said call.

25. The method according to claim 19, further comprising the step of accessing said call context database after completion of said call to perform a management function related to said call context data.

26. The method according to claim 25, wherein said management function is a billing operation related to said call.

27. The method according to claim 19, further comprising the step of accessing said call context database during said call to perform a management function related to said call.

28. The method according to claim 27, wherein said management function is a statistical analysis operation related to said call.

29. A method for processing calls in a telecommunications network, comprising:

receiving a call at an access network element coupled to said telecommunications network;

generating first call context data and a network call identifier related to said call;

storing said first call context data and said network call identifier in a call context database;

processing said call;

transmitting said network call identifier;

at a network element, receiving said call and said network call identifier from said access network element;

generating second call context data related to said call;

storing said second call context data in said call context database;

retrieving all call context data stored in said call context database based on said network call identifier; and processing said call based on said all context data retrieved from said call context database, wherein said call context database is distributed among a plurality of cooperating call context database management systems that are coupled to the telecommunications network, and wherein each cooperating call context database management system of the plurality of call context database management systems manages a subset of the call context database, the subset of the call context database corresponding to a range of network call identifiers.

30. The method according to claim 29, wherein said call context database is managed by a centralized call context database management system that is coupled to said intelligent telecommunications network.

31. The method according to claim 29, wherein each cooperating call context database management system of said plurality of cooperating call context database management systems is redundant to other cooperating call context database management systems of said plurality of call context database management systems.

32. The method according to claim 29, wherein said network call identifier is a unique identifier assigned to said call.

33. The method according to claim 29, wherein said call context data includes data that is generated automatically.

34. The method according to claim 29, wherein said call is placed by a caller and said call context database stores data retrieved from said caller during said call.

35. A system for managing a telephone network, comprising:

a call context database for storing call context data related to calls being processed by network elements within the telephone network and network call identifiers related to said calls; and a plurality of management systems coupled to said call context database and operative to access said call context database during said call, to retrieve said call context data from said call context database, and to process said call context data by performing a management operation, each of the plurality of management systems also being operative to manage a subset of the call context database, the subset of the call context database corresponding to a range of network call identifiers.

36. The system according to claim 35, wherein said management operation is a billing operation related to a set of calls being processed within said telephone network.

37. The system according to claim 35, wherein said management operation is a statistical analysis operation related to a set of calls processed within said telephone network.

38. The system according to claim 35, wherein said call context data includes network event records generated and stored by said network elements, said network event records being retrievable based on network call identifiers associated with said network event records.

39. A method for managing a telephone network, comprising:

storing call context data related to calls being processed by network elements within said telephone network in a call context database;

accessing said call context database during said calls;

retrieving said call context data from said call context database based on network call identifiers associated with the calls; and processing said call context data by performing a management operation, wherein the management operation is performed by at least one of a plurality of call context database management systems, each of the plurality of call context database management systems being configured to manage a subset of the call context database, the subset of the call context database corresponding to a range of network call identifiers.

40. The method according to claim 39, wherein said management operation is a billing operation related to a set of calls being processed.

41. The method according to claim 39, wherein said management operation is a statistical analysis operation related to a set of calls being processed.

42. The method according to claim 39, wherein said call context data includes network event records generated and stored by said network elements, said network event records being retrievable based on network call identifiers associated with said network event records.

\* \* \* \* \*